(12) United States Patent
Blomstedt

(10) Patent No.: US 12,242,088 B2
(45) Date of Patent: Mar. 4, 2025

(54) DIFFRACTIVE ELEMENT WITH DOUBLY PERIODIC GRATINGS

(71) Applicant: Dispelix Oy, Espoo (FI)

(72) Inventor: Kasimir Blomstedt, Espoo (FI)

(73) Assignee: Dispelix Oy, Espoo (FI)

( * ) Notice: Subject to any disclaimer, the term of this patent is extended or adjusted under 35 U.S.C. 154(b) by 241 days.

(21) Appl. No.: 16/618,188

(22) PCT Filed: May 18, 2018

(86) PCT No.: PCT/FI2018/050371
§ 371 (c)(1),
(2) Date: Nov. 29, 2019

(87) PCT Pub. No.: WO2018/220266
PCT Pub. Date: Dec. 6, 2018

(65) Prior Publication Data
US 2021/0165142 A1 Jun. 3, 2021

(30) Foreign Application Priority Data
Jun. 2, 2017 (FI) .................................. 20175509

(51) Int. Cl.
*G02B 5/32* (2006.01)
*F21V 8/00* (2006.01)
(Continued)

(52) U.S. Cl.
CPC ......... *G02B 5/1819* (2013.01); *G02B 6/0035* (2013.01); *G02B 27/0081* (2013.01)

(58) Field of Classification Search
CPC ................ G02B 5/1819; G02B 6/0035; G02B 27/0081; G02B 2027/0174; G02B 5/18; G02B 27/42; G02B 27/4205
(Continued)

(56) References Cited

U.S. PATENT DOCUMENTS 4,856,869 A 8/1989 Sakata et al.
6,580,529 B1 6/2003 Amitai et al.
(Continued)

FOREIGN PATENT DOCUMENTS

CN 103245996 A 8/2013
CN 105785493 A 7/2016
(Continued)

*Primary Examiner* — Audrey Y Chang
(74) *Attorney, Agent, or Firm* — Laine IP Oy

(57) ABSTRACT

The invention concerns a diffractive element, a method of producing a viewable image and an optical device. The element comprises a waveguide and a diffractive out-coupling region arranged on a surface or inside the waveguide, the out-coupling region comprising a plurality of sub-regions arranged laterally with respect to each other and being adapted to couple light propagating in the waveguide out of the waveguide. According to the invention, the sub-regions each comprise a doubly periodic grating pattern having a first period in a first direction and a second period in a second direction different from the first direction, and wherein there are at least two sub-regions having different grating patterns. The invention allows for combining out-coupling and exit pupil expansion on a single region of a waveguide.

28 Claims, 10 Drawing Sheets

(51) Int. Cl.
*G02B 5/18* (2006.01)
*G02B 27/00* (2006.01)

(58) Field of Classification Search
USPC .................. 359/34, 15, 566; 385/37, 146
See application file for complete search history.

(56) References Cited

U.S. PATENT DOCUMENTS

| | | | |
|---|---|---|---|
| 8,160,411 | B2 | 4/2012 | Levola et al. |
| 8,233,204 | B1* | 7/2012 | Robbins ................ G02B 27/01 |
| | | | 359/566 |
| 8,466,953 | B2 | 6/2013 | Levola |
| 9,341,846 | B2* | 5/2016 | Popovich ............. G02B 6/0035 |
| 2005/0135747 | A1* | 6/2005 | Greiner ................... G02B 5/32 |
| | | | 385/37 |
| 2006/0126181 | A1 | 6/2006 | Levola |
| 2009/0245730 | A1 | 10/2009 | Kleemann |
| 2010/0284085 | A1* | 11/2010 | Laakkonen ........ G02B 6/12007 |
| | | | 359/566 |
| 2014/0300966 | A1 | 10/2014 | Travers et al. |
| 2017/0102543 | A1 | 4/2017 | Vallius |
| 2017/0102544 | A1 | 4/2017 | Vallius |
| 2020/0088932 | A1* | 3/2020 | Schultz .................. G02B 6/006 |
| 2020/0278498 | A1* | 9/2020 | Schultz ............. G02B 6/29328 |

FOREIGN PATENT DOCUMENTS

| | | |
|---|---|---|
| CN | 106066501 A | 11/2016 |
| CN | 106338832 A | 1/2017 |
| CN | 106575034 A | 4/2017 |
| CN | 106773057 A | 5/2017 |
| JP | 2003532918 A | 11/2003 |
| JP | 2014139673 A | 7/2014 |
| WO | WO2007031991 A2 | 3/2007 |
| WO | WO2014044912 A1 | 3/2014 |
| WO | WO2016020643 A1 | 2/2016 |
| WO | WO2016141372 A1 | 9/2016 |
| WO | WO201703982 A1 | 3/2017 |
| WO | WO2017062139 A1 | 4/2017 |

* cited by examiner

First surface of waveguide

Opposite surface of waveguide

A stack of two or more waveguides arranged as a cascade, at least one other of the waveguides comprising an in-coupling region, whereby the out-coupling region is configured to feed said in-coupling region of said other waveguide.

FIG. 18

DIFFRACTIVE ELEMENT WITH DOUBLY PERIODIC GRATINGS

FIELD OF THE INVENTION

The invention relates to diffractive optics. In particular, the invention relates to diffractive elements that can be used for example in augmented reality (AR), virtual reality (VR), mixed reality (MR) applications, such as near-to-the-eye (NED) displays, and also various lighting applications. The invention also relates to a method utilizing diffractive optics.

BACKGROUND OF THE INVENTION

Exit pupil expanders (EPEs) can be used to increase the exit pupil of diffractive displays. Conventionally, the EPE is a separate grating arranged on a waveguide between a light in-coupling grating and a light out-coupling grating of the display. The maximum field-of-view (FOV) of a conventional single lightguide with a 2D exit pupil expander (EPE) depends on the refractive index of the lightguide the wavelength band of projected light. When wavelength band is 460-630 nm and lightguide refractive index is 2.0, the maximum FOV is around 33-35 degrees. For monochromatic light, the maximum FOV is about 50 degrees. To increase FOV, typical approach is to use multiple lightguides.

One example of 2D exit pupil expansion (light field is expanded in two dimensions) is disclosed in U.S. Pat. No. 6,580,529. Pupil expansion with singly periodic gratings is discussed in US 2006/0126181 and U.S. Pat. No. 8,466,953, for example. Doubly periodic gratings for exit pupil expansion are discussed in U.S. Pat. No. 8,160,411.

When using such exit pupil expansion gratings there are strict limitations on the possible placement of in-coupling, exit pupil expansion and out-coupling regions, which specifically implies that much of the surface area of the waveguide is wasted for other purposes than out-coupling and thus leads to devices that are unnecessarily, even cumbersomely, large. For example, in so-called 'spectacle' form factor usable e.g. in smart glasses and the like, it is desired to have a large portion of the waveguide serving to out-couple light. However, if the EPE takes a significant portion thereof, less space if left for the out-coupling grating. Also the positioning of the projector is very restricted in conventional approaches.

A doubly periodic grating for exit pupil expansion and out-coupling is disclosed also in WO 2017/062139.

Thus, there is a need for improvements in diffractive display technology.

SUMMARY OF THE INVENTION

It is an aim of the invention to solve at least some of the abovementioned problems and to provide a solution that relieves current design restrictions and offers novel possibilities for the design of diffractive elements.

A particular aim is to provide a solution that allows for using a larger portion of waveguide surface area for out-coupling of light, still allowing for expansion of the exit pupil of the element. An aim is also to provide a solution that allows for increasing the FOV of diffractive displays, such as NEDs.

These aims are met by the invention as hereinafter described and claimed.

The invention is based on forming the out-coupling region of a diffractive element from a plurality of sub-regions that have at least partly different doubly periodic grating patterns. This provides new freedoms for design for out-coupling of light in optical devices, and in particular increasing the size of out-coupling regions and the achievable FOV. In particular, the sub-regions may have the same internal periods at the same angles with respect to each other and also with respect to the waveguide, but different microstructure of their elementary grating features. This allows for exit pupil expansion to take place within the out-coupling region, whereby no separate exit pupil expansion regions are needed.

Thus, the invention provides a diffractive element comprising a waveguide and a diffractive out-coupling region arranged on a surface or into the waveguide. The out-coupling region comprises a plurality of sub-regions arranged laterally with respect to each other and are adapted to couple light propagating in the waveguide out of the waveguide.

The sub-regions each comprise a doubly periodic grating pattern having a first period in a first direction and a second period in a second direction different from the first direction. At least two of the sub-regions have different grating patterns.

The invention also provides an optical product comprising a diffractive element of the above kind and a light source adapted to direct light into the waveguide of the diffractive element.

The present method comprises coupling light to waveguide to produce light propagating in the waveguide via total internal reflections and coupling the in-coupled light out of the waveguide using a diffractive out-coupling region of the above kind. The sub-regions can be adapted to simultaneously expand the exit pupil by internal diffractions and couple light out of the out-coupling region at each location thereof. Light can be coupled to the waveguide diffractively, such as using an in-coupling grating on a main surface of the waveguide, or by other means, such as from the side of the waveguide using a prism.

More specifically, the invention is characterized by what is stated in the independent claims.

The invention offers significant benefits. Since a subdivided doubly periodic out-coupling region can, in addition to out-coupling, also perform beam expansion, no separate beam-expansion regions are required. Thus, the invention allows for combining out-coupling and exit pupil expansion on a single region of a waveguide. This means that the out-coupling region can fill a larger portion of the surface area of the waveguide than in conventional solutions and still provide the same or even larger exit pupil size and FOV. It is even possible to make an out-coupling region that essentially fills the whole waveguide surface area that is visible to the user. This is in contrast to waveguide geometries, where beam expansion is realized by separate gratings and by grating-free areas of the waveguide for free propagation of the rays, which cannot allocate but a fraction of the waveguide surface for actual image production.

The invention overcomes the restrictions of conventional grating geometries involving singly periodic separate gratings. These impose quite strict restrictions on which waveguide 'modes' can be used for beam propagation and beam expansion purposes, which leads to an underutilization of these modes and further limits the amount of information (size of FOV) that can be transferred by the waveguide.

In addition, in conventional solutions, there is only little variation in the possible configurations of the ray-paths taken by different display directions (pixels) and different wavelengths, which limits the number of design freedoms that can be utilized to meet the design goals (FOV, efficiency, light-field uniformity etc.) when optimizing the grating structures. In particular, singly periodic character already significantly reduces the number of design choices available at the onset. The present configuration utilizes a plurality of differently configured double periodic gratings in functional optical connection with each other on the same waveguide to overcome these limitations.

The invention overcomes the FOV restrictions of conventional exit pupil expansion solutions, and allows for a FOV of up to at least 90° for monochromatic and up to at least 70° for full color displays (with refractive index 2.0) within a single waveguide geometry.

The invention suits for several in-coupling schemes. In display applications, an in-coupling grating positioned on the waveguide can be used for achieving diffractive in-coupling. However, the principles presented herein are also usable to efficiently spread light between the out-coupling regions if the in-coupling takes place in another way, such as on one or more lateral sides of the waveguide or using a prism.

The dependent claims are directed to selected embodiments of the invention.

In some embodiments, the grating patterns of the sub-regions and positions of the sub-regions, are choses so as to expand the exit-pupil of the element and to out-couple light propagating in the waveguide simultaneously, i.e., doing both these tasks at some or typically all locations thereof. Combining the beam expansion and out-coupling regions in this way leads to more freedom in design. Specifically, this makes it easier to meet the challenges faced in 'spectacle'-type applications, where the size of the waveguide (lens) is restricted.

In some embodiments, the grating patterns of the sub-regions are adapted to diffract light internally in the waveguide into at least three different diffraction orders and out of the waveguide using at least one, in particular exactly one, diffraction order at least at some sub-regions of the out-coupling region, typically at each location thereof. The application of multiple diffraction orders inside the waveguide efficiently allows for spreading light to each location of the out-coupling region to expands the exit pupil. This also leads to a significant difference in the ray paths corresponding to different directions (pixels) and different wavelengths.

In some embodiments, the grating patterns of at least two sub-regions and even all sub-regions, are different with respect to each other in that they are formed of differently shaped periodically arranged elementary features that define the first and the second period, i.e. they have different microstructure.

Generally speaking, the elementary features of different sub-regions can have different lateral shapes, height profiles or both lateral shapes and height profiles. In practice, there is an infinite number of different feature shapes than can be used.

In some embodiments, at least some, or all, sub-regions have a doubly periodic binary grating pattern. Whereas singly periodic binary gratings can be fully represented in terms of a finite number of transition points, the doubly periodic gratings can support complex two-dimensional lateral shapes, whose complete description requires a significantly more coefficients. Hence even binary gratings with doubly periodic pattern are much more complex than singly periodic binary gratings and thereby provide substantially more design freedoms.

In some embodiments, at least some, or all, sub-regions have a doubly periodic binary grating pattern. Using non-binary profiles increases design possibilities even more compared with binary profiles.

In some embodiments, the microstructures of the grating patterns are different in that they are chosen so as to diffract light each in the same diffraction orders but with different diffraction efficiencies. To achieve this in practice, the grating pattern of each sub-region can be different from the grating pattern of any other sub-region with regard to their microstructure.

In some embodiments, the grating patterns of each of the sub-regions have the same first period, the same second period, and the same angle between the first and second periods.

The first and second periods can be the same or different. Further, the grating patterns of the sub-regions may have the same orientation with respect to the waveguide. That is, the first (second) period in each sub-region extends in the same direction as the first (second) period of other sub-regions. By making one ore more of these factors constant makes for example the use of multiple in-coupling regions straightforward.

Each sub-region is internally 'homogeneous' is a sense that the grating pattern fills the whole sub-region and the properties of the grating pattern therein are constant (within manufacturing tolerances) from period to period.

The sub-regions, each comprising multiple periods of grating, on the waveguide surface(s) may have different shapes.

In some embodiments, the sub-regions are arranged in a regular grid, such as a rectangular grid. Alternatively, the sub-regions may be arranged in an irregular formation. In both cases, they preferably cover a contiguous area of the waveguide, i.e. are directly adjacent to each other.

Instead of being arranged on only one surface, there may be such subdivided diffractive region on two opposite surfaces of the waveguide. This can be used to give even more freedoms of design and/or to make the ray propagation even more efficient in view of exit pupil expansion.

In some embodiments, the element comprises one or more diffractive in-coupling gratings arranged onto the waveguide, the in-coupling grating(s) being adapted to diffractively couple light directed thereto to the lightguide for propagation to the out-coupling region via total internal reflections. This solution is particularly useful in display applications, where the initial light beam is projected from a microprojector and carries an image to be shown by the out-coupling region. In particular, the in-coupling grating(s) are provided with either singly periodic or doubly periodic grating patterns. Particularly, the grating pattern can be a doubly periodic pattern with the same periods and angle between the periods as the out-coupling sub-regions.

In some embodiments, the out-coupling region is configured, by the differences of the doubly periodic grating patterns of its sub-regions and lateral shapes of the sub-regions, to expand the exit pupil of the element and to retain relative pixel positions, and optionally also relative pixel intensities to a predefined degree, between in-coupled light and out-coupled light.

In some embodiments each image pixel of the in-coupling grating and corresponding image pixel of the out-coupling region is represented by at least three ray directions propagating in the waveguide, whose convex combinations comprise all possible propagation directions.

In some embodiments, the doubly periodic grating patterns are capable of, at each sub-region, utilizing multiple different diffraction orders, in particular at least three different diffraction orders, of the in-coupled light for expanding the exit pupil of the element, and one diffraction order for out-coupling light from the element.

In some embodiments, the out-coupling region is configured, by said doubly periodic grating patterns of said sub-regions, so that possible ray paths of different image pixels from the in-coupling grating to the out-coupling region significantly differ from each other. That is, the totality of light pathways within the waveguide corresponding to two neighboring pixels may differ significantly from each other if compared to the difference in light pathways that are obtained when conventional (singly periodic) grating structures are used. In particular, the pathways differ if rays originating from different pixels hit different sub-regions at some point of propagation, whereby they are diffracted into several diffraction orders with different intensities.

In some embodiments, the lateral shapes and locations of the sub-regions and their grating patterns are chosen so as to expand the FOV of the out-coupling grating for monochromatic light in at least one direction by at least 50%, in particular at least 75% compared with a FOV achievable using singly periodic gratings and the same waveguide material.

Typically, the number of sub-regions is 10 or more, such as 10-10000, in particular 20-3000, for example 20-300.

In some embodiments, each of the sub-regions forming the out-coupling region has a size, which is at least ten grating periods in both principal directions of the doubly-periodic grating contained therein. That is, in at least some cross-sections of the sub-region, there are at least ten full periods of the grating. The size can be e.g. 10-50000 periods, such as 100-5000 periods, in both principal directions.

In some embodiments, the present element is part of a stack of waveguides which are arranged as a cascade. Thus, instead of providing light directly to the user's eye, the element may be and adapted to feed another waveguide of the system, i.e. act as a light source for another waveguide.

The invention is useable in augmented reality, virtual reality and mixed reality applications, in particular near-to-the-eye (NED) displays, where the aim is to present an image carrying information. However, the invention also allows for light field expansion in other applications, including such where the light field is not intended to carry specific information, such as in decorative or consumer electronic lighting applications, for example light panels of backlit displays. For example in liquid crystal displays, the backlight illumination is on the border of the system, whereas the light must be spread uniformly over the whole display area.

Next, embodiments of the invention and advantages thereof are discussed in more details with reference to the attached drawings.

BRIEF DESCRIPTION OF THE DRAWINGS

FIG. 18 illustrates a stack of waveguides as supported by claim 25 as filed.

DETAILED DESCRIPTION OF EMBODIMENTS

Definitions

Figure 1:
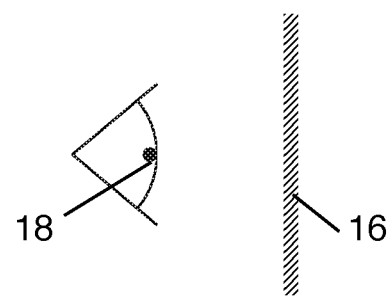
FIGS. 1 and 2 illustrate in side view and perspective view a NED and user's eye.

"Waveguide" refers to a structure capable of guiding light via total internal reflections therein.

"Out-coupling region" is a diffractive structure capable of coupling light travelling inside a waveguide, onto which the structure is arranged, out of the waveguide on at least some portion thereof, such as at each location thereof.

"Exit pupil expansion" refers to the process of spreading light in a waveguide in a controlled manner so as to expand the area at which out-coupling of light may occur.

"Sub-region" refers herein to a portion of the out-coupling region that is distinguishable by the properties of its grating pattern with respect to other sub-regions.

"Doubly periodic grating pattern" refers to a grating pattern formed by elementary features arranged in a periodic formation so that the grating has a first period at a first (lateral) angle and a second period at a second (lateral) angle different from the first angle. Thus, there is a non-zero angle between directions defined by the periods. The angle can be e.g. 1-90 degrees, such as exactly 90 degrees. Thus, the grating patterns herein are characterized by the two periods, the angle between the periods and a collection of free-form shapes of the elementary features, i.e. the microstructure, of the grating ("grating properties"). Both two periods of a doubly periodic grating pattern are in the optically diffractive range, typically being 1 μm or less, such as 200-800 nm. Each doubly periodic grating pattern can be formed of elementary features arranged in a single layer or multiple layers close to each other so as to form an optically single grating.

It should be noted that the use of sub-regions with a one-dimensional, i.e. singly periodic, grating pattern, a void, or any other structure, among the doubly periodic sub-regions is not excluded.

"Elementary feature" refers to the smallest periodically repeating structure that forms a grating in at least one dimension and being distinguishable by its index of refraction from its surrounding material(s).

"Lateral" refers to in-plane directions parallel to the surface of the waveguide and the plane of the grating arranged thereto (as defined by its periods).

"Lateral shape" of an elementary feature refers to its footprint in the lateral plane. Typical lateral shapes include, but are not limited to, rectangular, triangular, hexagonal, octagonal, elliptical and circular shapes. Herein, very complex and irregular lateral shapes are equally possible.

"Height profile" of an elementary feature refers to its cross-sectional shape at any plane normal to the lateral plane and intersecting with the feature. Typical height profiles include, but are not limited to, binary (rectangular), triangular and blazed profiles.

Description of Selected Embodiments
General

Next, selected embodiments and design rules for carrying out the invention in practice are presented. In particular, a structure is described in which exit pupil expansion and out-coupling regions are combined whereby a significant portion of waveguide surface (or even the full waveguide surface, except for potential in-coupling region), can be utilized as an out-coupling region. This makes it possible to design e.g. AR displays in the 'spectacle' form-factor such that the out-coupling region fills the whole surface area of the lens of each eye. Typically, the in-coupling region resides outside the field of view (for example where the lens attaches to the frame) and will hence not affect the usage of the lens area.

The structures proposed are able to utilize as many of the available waveguide 'modes' as theoretically possible for light-field propagation. Design rules are presented than can be applied to achieve this utilization. These design rules call for each image pixel to be represented by at least three ray directions, whose convex combinations comprise all possible propagation directions. Apart from this fundamental restriction the full gamut of propagation directions in the waveguide or waveguide 'modes' can be utilized for image/information transport.

The invention is described primarily in the context of personal, wearable display applications, including head-mounted displays (HMDs), in particular NEDs. In these applications, a goal is to form, using the out-coupling region, a viewable image that faithfully represents an original image coupled to the waveguide, thus retaining pixel color and relative pixel positions when light travels from an in-coupling position to an out-coupling position and the exit pupil expansion therebetween. However, the same principles can be applied to achieve e.g. even white-light backlighting for LCD displays or decorative lighting devices.

Element Configuration

Figure 2:
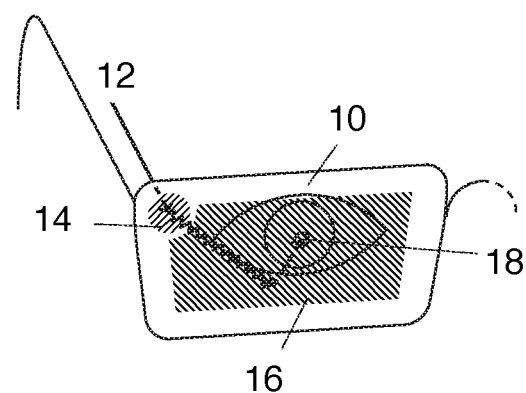

FIGS. 1 and 2 illustrate a near-to-the-eye (NED) device for augmented reality applications, where an image superimposed on the normal view of an eye is produced by an out-coupling region 16 placed in proximity to the an eye, typically a few centimeters from the pupil 18. One possible form factor for near-to-the-eye devices is the 'spectacle' form factor shown in FIG. 2, where the near-to-the-eye devices replace (no visual correction) or sit on top of (visual correction) the spectacle lens. In such a configuration the image is produced for example in the spectacle frame by a projector or other display device, producing a beam of incident light rays 12, which illuminate an in-coupling grating 14 of a waveguide 10. At the in-coupling grating 14 the light is diffracted and the light field is carried by the waveguide 10 to an out-coupling region 16 where light is out-coupled and it illuminates the pupil 18 of the user's eye.

The configuration of FIG. 2 is only one specific example, with many different variations and configurations possible. That is, the waveguide 10 and its in-coupling area, out-coupling region 16 can be arranged differently. Several variations are possible in particular when the presently disclosed out-coupling region combining out-coupling and exit pupil expansion is used, since it frees surface area of the waveguide by eliminating the need of separate out-coupling gratings and provides also other freedoms of desing e.g. related to positioning of in-coupling grating(s).

The configuration can be such that the device provides an image for one or for two eyes, but two-eye functionality can also be achieved by using two separate devices, one for each eye. Here the one-eye or each-eye-separately configuration is described, but the same principles are equally well applicable in the two-eye setting also covered by the invention.

Figure 3:
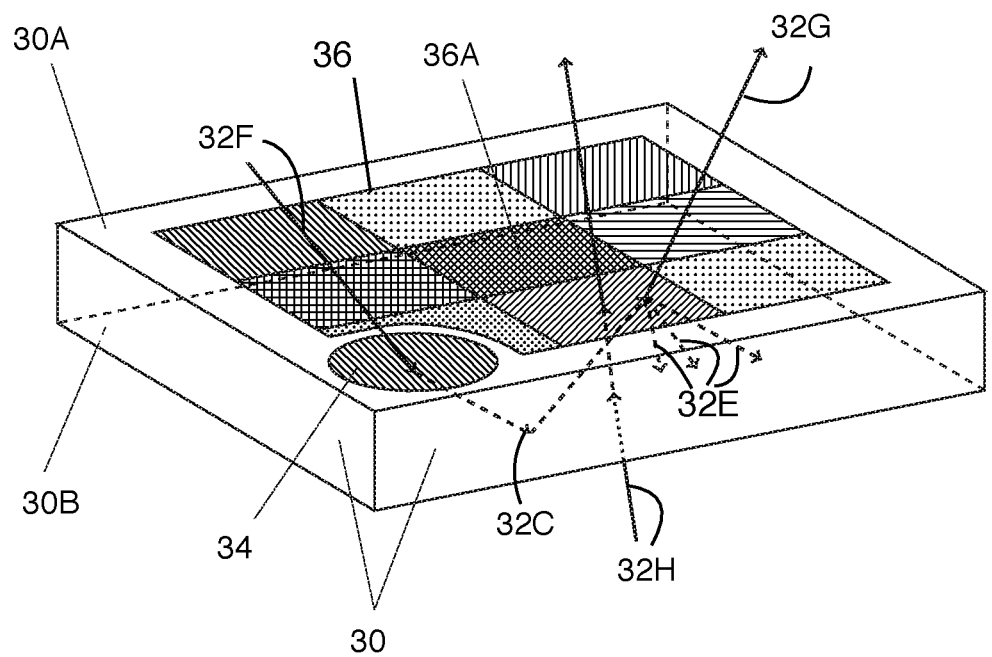
FIG. 3 illustrates in a schematic perspective view a diffractive element according to one embodiment.

FIG. 3 shows schematically a waveguide structure 30 according to one embodiment of the invention. It comprises of two principal surfaces 30A, 30B at which total internal reflection occurs and the waveguide 30 (also called waveguide proper) where wave propagation takes place. One principal surface 30A of the waveguide 30 is fully or partially covered by a diffractive doubly periodic out-coupling region 36, which can modify the light field 32E inside the waveguide 30 and couple light rays 32G out from the waveguide 30. Waves travelling from the in-coupling grating 34 to the out-coupling region 36 are denoted with numeral 32C. Light rays 32H from the environment pass through the grating with minimal distortion (in see-through applications, such as AR).

The out-coupling region 36 is divided into several doubly periodic sub-regions 36A having different microstructures, but the same periods and angles between the two periods and the same mutual orientation on the waveguide 30.

In FIG. 3 an embodiment is illustrated where only one principal surface 30A of the waveguide 30 is provided with an out-coupling region 36. In some embodiments, both principal surfaces 30A, 30B are provided with a similar or different kind of doubly periodic out-coupling region divided into sub-regions having different microstructures. This has the advantage that the light is modified at each surface 30A, 30B when the light travels inside the waveguide 30.

Figure 4:
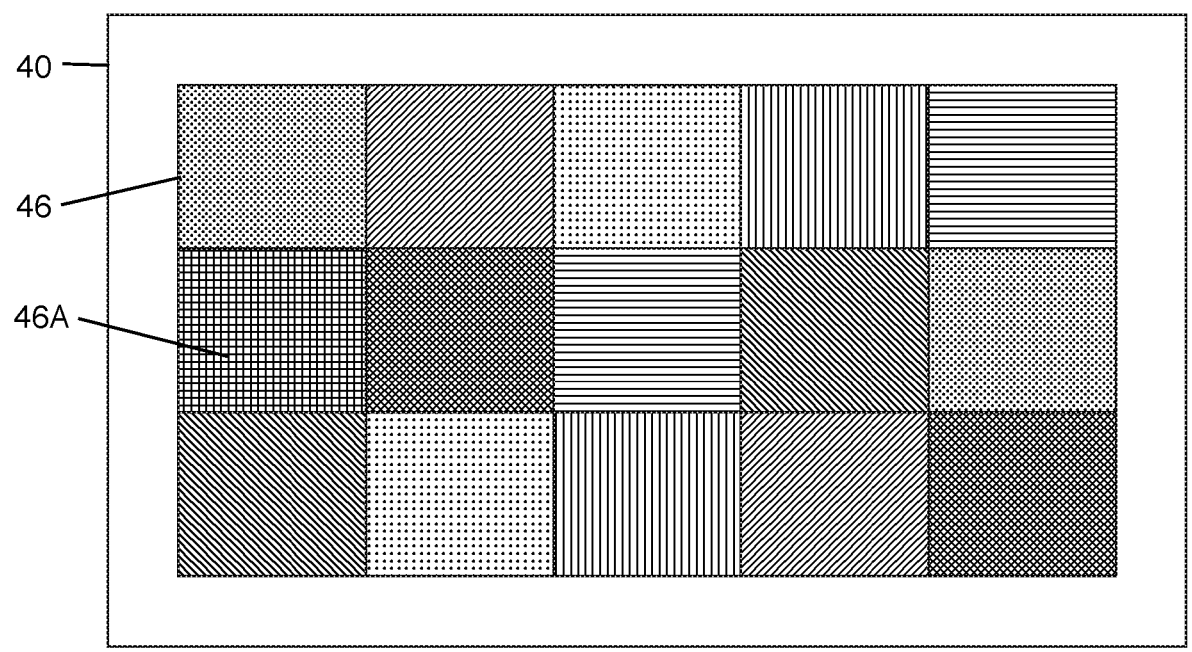
FIGS. 4 and 5 illustrate a regular and non-regular subdivision, respectively, of the out-coupling region into sub-regions.
Figure 5:
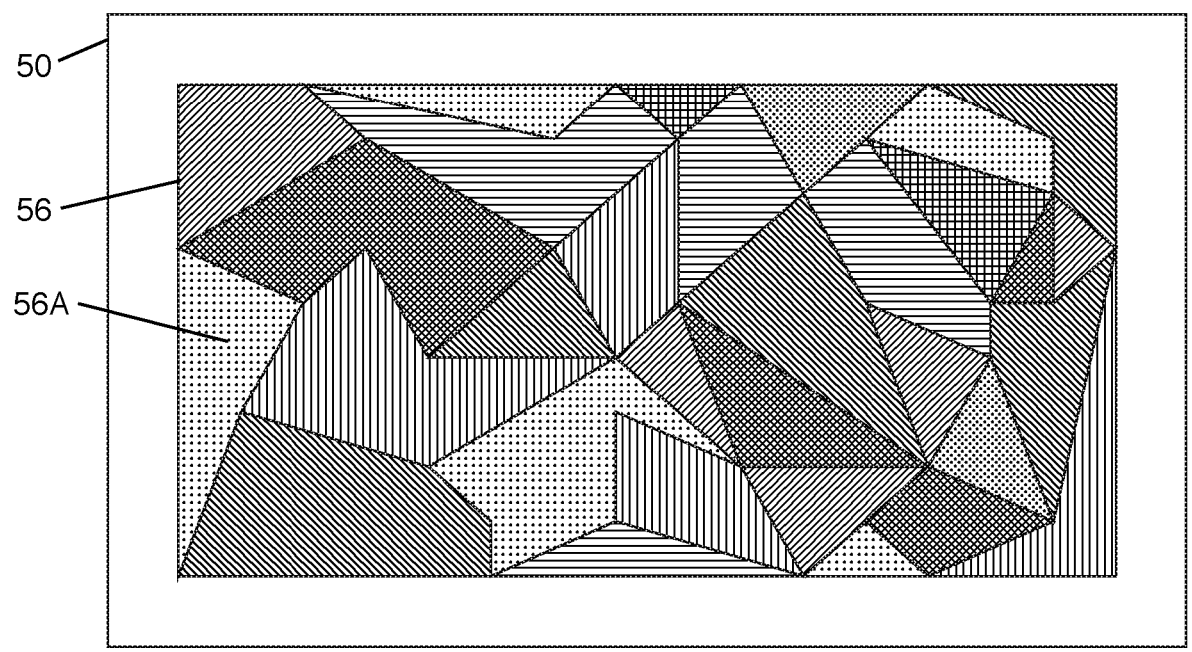

Two embodiments of different out-coupling region configurations are shown in FIGS. 4 and 5. Both concern a geometry where the region 46, 56 on a waveguide 40, 50 is two-dimensionally divided along the direction of its principal surface into neighboring sub-regions 46A, 56A. Within each sub-region 46A, 56A there is a grating pattern whose properties are unchanged. That is, the grating pattern inside a sub-region is laterally constant. The subdivision can be regular, as shown in FIG. 4, such as one consisting of rectangular or other regular tilings, or completely irregular, as shown in FIG. 5. The subdivision can also be between these ends, i.e., periodic or pseudoperiodic.

In some embodiments, each sub-region has the same lateral shape. In some alternative embodiments, each of the sub-regions has a lateral shape, which is different from the lateral shape of at least one other sub-region, i.e., there are at least two different sub-region shapes present. Further, in some embodiments each of the sub-regions has a lateral shape, which is different from the lateral shape of each other sub-region. The out-coupling region as a whole may have any lateral shape.

If out-coupling regions on both surfaces of the waveguide are used, what is said above applies to both these regions separately.

Here such waveguides are illustrated where the principal surfaces are planar, but the invention is equally applicable to waveguides with curved surfaces (in particular sections of spherical surfaces). Similarly, the waveguide proper is here treated as being of constant refractive index, but within the scope of the invention other waveguide structures can also be considered, such as gradient-index profiles and stacks of constant-index materials interspaced with diffractive gratings, or even stacks of waveguide propers.

In-coupling region or regions are not specifically illustrated in FIG. 4 or 5. They may be laterally separated from the out-coupling region or be adjacent to it. It should particularly be noted that any of the sub-regions 46A, 56A exemplified in FIG. 4 or 5, can serve as an in-coupling region as such or, in particular, when provided with a dedicated in-coupling grating pattern maximizing the in-coupling efficiency. It should be noted that if several in-coupling regions are used, they can be considered in unison, since to determine the out-coupling configuration herein discussed, one does not need to know how the in-coupling function is divided between the different regions.

Optical Operation of the Element

The subdivided doubly periodic out-coupling region, and typically also one or more doubly periodic in-coupling regions allows for using three, and typically even more, ray directions for each image pixel. This means that the ray paths from the in-coupling to the out-coupling region will contain rays propagating in different directions (i.e., they do not tend to any particular direction). This also implies that the ray paths for different image pixels and for different wavelengths will differ markedly from each other since the ray paths essentially represent a form of chaotic billiards. The variability provides a significant design freedom when optimizing the performance of the waveguide structure to meet set design criteria (efficiency, uniformity, etc.), since typically the optimal design represents a compromise between the characteristics of the individual rays, which are now conveniently separate from each other. The design criteria are discussed later in this document in more detail.

The use of doubly periodic gratings also provides a richer source of design freedoms than the use of singly periodic gratings. This richness is due to the practically squared number of parameters characterizing such gratings, but their two-dimensional (in the plane of periodicity) character also provide more easily recognizable benefits. Indeed, we note that in the case of binary gratings, whereas singly periodic binary gratings are fully characterized by their period, height and their transition points, doubly periodic binary gratings are characterized by their two periods, the angle between the periods and a collection of free-form two-dimensional shapes. The free form of the shapes or regions provides doubly binary gratings with a significantly larger set of design freedoms than singly periodic binary gratings have.

Given that binary gratings are much easier to manufacture than gratings with more complex variations in height, these design freedoms directly translate into benefits (better performance, etc.) associated with actual manufactured products. It is however, not excluded that the gratings herein are non-binary, i.e. have a more than two-level height profile.

The use of doubly periodic gratings also provides allows the use of annulus of propagating modes to the full extent possible, when such gratings are used for in-coupling and out-coupling of the rays (see also detailed discussion below with respect to FIG. 7, for example). As discussed more extensively later in this document, the theoretical upper limit for the ratio of the image area to the annulus area is 33%, but for practical applications the ratio is about 12% for monochromatic displays and 8% when displaying the full visible spectrum, which translate to fields-of-views (when the aspect ratio is 16:9) of about 90° and 70°, respectively. This can be contrasted with the ratios 4% and 2%, corresponding fields-of-views 50° and 35° achievable by systems, where singly periodic gratings are used. Additionally, the present high area ratios are automatically available for almost arbitrary waveguide geometries as long as the relatively simple design rules are followed, whereas systems where separate field expansion regions are used must be hand-tuned for each geometry to reach the maximum area ratios, which furthermore depend strongly on the waveguide geometry.

Although these considerations apply to single-waveguide systems, the invention can also be used in multiple-waveguide settings, which include systems, where different parts (e.g., spatially and/or spectrally fully or partially separated) of the image propagate in different waveguides and systems where the out-coupling regions of one or more waveguides may feed the in-coupling region(s) of one or several waveguide(s) instead of or in addition to the user's eye and in place of a light source proper.

Because herein doubly periodic gratings are used, the freedoms related to such gratings can be utilized. When compared to singly periodic gratings, these freedoms include the additional period and the angle between the directions of periodicity.

The use of doubly periodic gratings means that each grating can couple between all the 'modes' of an incident ray inside the annulus and the inner circle. For singly periodic gratings, the same result can only be obtained by using several gratings at different locations of the waveguide, which is problematic from a design point of view since propagation is required for the transition from one grating to the other and therefore the processing is non-local and requires careful consideration of the propagation directions.

With doubly periodic gratings it is, specifically, possible to utilize rays with non-zero order modes in the inner circle of the diagram, that is, modes propagating outside the waveguide, but not inside it. This feature makes it possible to maximize the utilization of the propagating modes annulus area for image transmission. The spill of light into unwanted directions does not impair the image quality if the design rules are followed and the loss of efficiency that the use of these rays implies is a design freedom that can be utilized and controlled by the optimization process.

Design Principles

Next, the key principles allowing a skilled person to optimize the shapes of the sub-gratings and properties of the grating patterns for implementing a variety of elements of the present kind for different purposes are explained.

The aim of waveguide optimization for display purposes is to find a set of gratings for the in-coupling and out-coupling regions such that every display pixel is coupled into the waveguide in at least one in-coupling region and is duplicated with sufficient spatial frequency across the out-coupling region, so that the image at the retina of the observers eye as produced by the rays emanating from the out-coupling regions is a faithful reconstruction of the original image.

The basic notion of a faithful representation is that each pixel of the original image is mapped correctly with respect to the other pixels of the image. In the present geometry, the pixels of the image are represented by incoming rays propagating in specific directions before reaching the in-coupling region. Hence a faithful representation means, in the optimal or near-optimal case, that I. Such incoming rays should retain their direction (or a simple mapping, such as mirroring, thereof) after exiting the out-coupling regions.

II. Projection of the pixel spectrum into the CIE space, corresponding to the spectral response of the human eye, is maintained. In practice this means that certain combinations of the wavelengths of light should remain (approximately) invariant when considered as a whole.

III. Interpixel intensity relations remain unchanged.

IV. Overall intensity (output intensity) is maximized.

V. The abovementioned criteria I-IV are (approximately) uniform across the eye-box, i.e. the out-coupling region or portion thereof to be viewed. This is because the human eye is typically not stationary with respect to the illumination provided by the display device.

VI. At all pupil positions at least one ray corresponding to each pixel reaches the eye, which basically sets a lower bound on the spatial frequency with which such rays should emanate from the out-coupling regions.

It is usually impossible in practice to satisfy all the above mentioned criteria exactly. However, for practical purposes, it is often sufficient to only satisfy criteria I (ray propagation directions) and IV (a sufficient spatial frequency for ray exit points) exactly. This can be carried out explicitly by diffractive waveguide calculations known per se. The remaining criteria can be approximately satisfied explicitly or by computer optimization.

Usually, a trade-off between these criteria is acceptable. It is therefore sufficient to fix the grating geometry, that is, the periods, the angle between the periods, shapes and locations of the sub-regions of the gratings, so that criteria I and VI are satisfied, while an optimization algorithm with enough design freedoms may also be used to guarantee that an optimization result solution, where criteria II-V are satisfied to a sufficient degree of accuracy, can be found. In particular, the optimization algorithm is configured to determine the shape of the elementary features, i.e, the microstructure, in each sub-region so that the criteria II-V are satisfied to a predefined degree.

Figure 6:
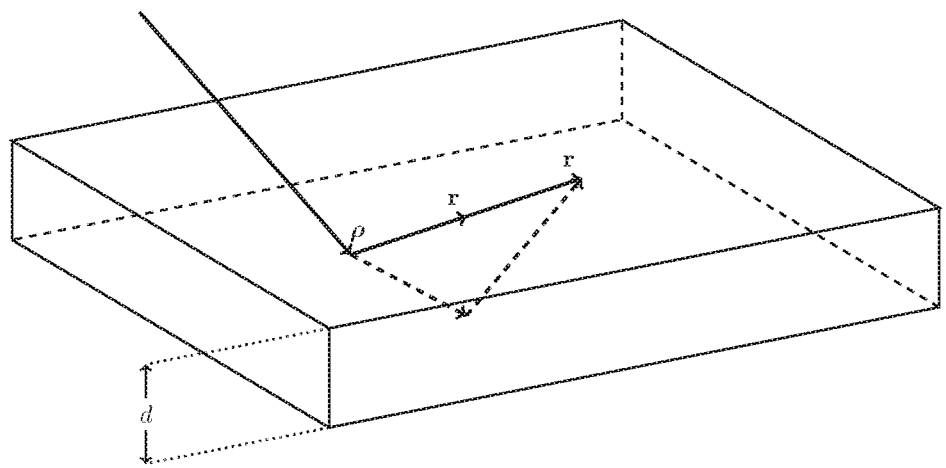
FIG. 6 illustrates the optical operation of the present waveguide.

Referring to FIG. 6, the criteria I and VI are both related to the propagation of rays in the waveguide. The direction of propagation of a ray is most conveniently described in terms of the wave vector of the corresponding plane wave divided by its length in vacuum, that is, by a vector $\rho$. To simplify the exposition we will now concentrate on planar waveguides, but analogous design criteria hold for spherical waveguides. As is the focus of this invention we also consider only doubly periodic gratings. Let us then consider a coordinate system, where the z-axis is perpendicular to the (planar) principal surfaces of the waveguide, so that apart from the constant z-coordinate, any point on these surfaces can be represented by its x- and y-coordinates. Then the propagation properties of any ray is completely specified by the x- and y-components of the vector $\rho$, $\rho_x$ and $\rho_y$, which furthermore remain unchanged when the ray passes into or out from the waveguide, is reflected by total internal reflection at the waveguide principal surfaces, or is diffracted to the (0, 0)-diffraction order by a grating. Higher diffraction orders are described by shifts of $\rho$ of the form $pa+qb$, where the vectors a and b are related to the two periods of the grating and to the wavelength, and the integers p and q are the corresponding diffraction orders. The z-component of the vector $\rho$ is determined by the fact that the length of $\rho$ equals the refractive index n of the material where the ray propagates. In particular, since the thickness d of a planar waveguide is constant, it follows that the z-component determines the spatial distance r in the xy-coordinate system between two consecutive locations where the ray hits the principal surfaces (FIG. 6). We can explicitly represent the shift in the xy-plane by a vector r with $r_x=c\rho_x/\rho_z$ and $r_y=c\rho_y/\rho_z$, where c is a constant and $\rho_z^2=n^2-\rho_x^2-\rho_y^2$.

Figure 7:
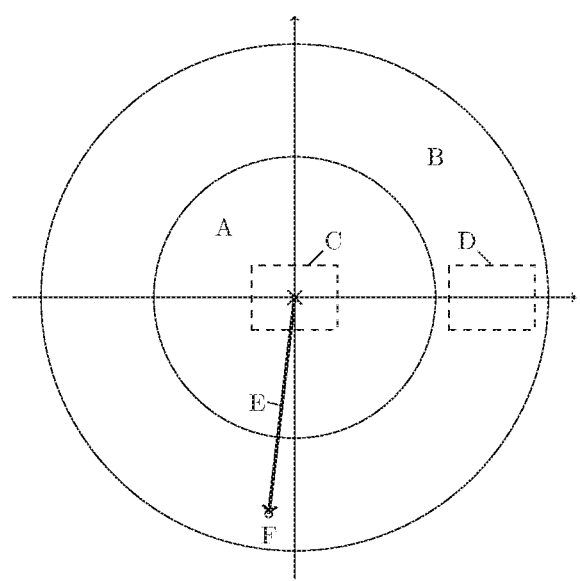
FIGS. 7-11 show wave vector graphs in different configurations of a diffractive element.

The behavior of a ray with respect to a waveguide can then be conveniently illustrated by a diagram (FIG. 7) in $\rho_x\rho_y$-space, where each ray is represented by a point, the inner circle, whose radius equals the refractive index of the material outside the waveguide, represents rays propagating outside the waveguide (FIG. 7: A), and the outer circle, whose radius equals the refractive index of the waveguide, represents rays that propagate inside the waveguide (FIG. 7: A,B). Those rays, that lie in the annulus (FIG. 7: B) defined by the two circles, propagate inside the waveguide, but undergo total internal reflections at its principal surfaces, that is, they represent the 'modes' of the waveguide. It is these rays that can be used to transfer the image from one part of the waveguide to another. Since the image itself (FIG. 7: C) propagates outside the waveguide, it must be represented by rays propagating outside the waveguide and is thereby always located inside the inner circle. It can be shifted into the annulus (FIG. 7: D) by gratings in the in-coupling region and back by gratings in the out-coupling regions. We note that the direction of propagation (direction of r) of a ray in the principal planes of the waveguide is directly given by the vector (FIG. 7: E) that points from the origin to the point representing the ray in the diagram (FIG. 7: F), but to get r itself, the length of the vector must additionally be multiplied by the factor $c/\rho_z$.

Let us now assume that a ray enters the waveguide through an in-coupling grating and propagates from one diffraction grating, on either of the waveguide surfaces, to another, until it is finally out-coupled by one of these gratings. We also assume that all rays discussed correspond to light of the same wavelength.

Herein, monochromatic displays are discussed as one useful area of application. However, this does not pose a fundamental restriction of the principles presented here and skilled person can straightforwardly extend the design criteria to the full visible spectrum by simultaneously considering the design criteria for all the different wavelengths therein.

From criterion I we observe that for all out-coupled rays the ray position in the diagram must be the same as for the ray that entered the in-coupling region, that is, $\rho_x$ and $\rho_y$ should be unchanged. If we label the gratings that the ray has passed when traversing through the waveguide by j, the total shift of $\rho$ along the ray path can be written as the sum of contributions of the form $p_ja_j+q_jb_j$. Taking into account that each ray that enters the waveguide will be split into subrays propagating into different diffraction orders (different $p_j$, $q_j$) at each grating, we observe that as a first step in guaranteeing that this sum vanishes for all out-coupled subrays, it is most convenient to take $a_j=a$ and $b_j=b$ for all j. That is, we fix the double periodicity of all gratings in the system (in-coupling and out-coupling) to the same configuration, i.e., we fix both the periods and their directions. This configuration still leaves open the possibility that propagating rays corresponding to different diffraction orders overlap, either in the annulus or inside the inner circle.

Geometrically it is straightforward to see that if a and b are chosen relatively to a fixed image shape, so that all higher diffraction orders of the image are outside the inner circle, this automatically also means that all diffraction orders of the image are mutually separate. Excluding all but the (0, 0) diffraction order from the inner circle makes sense, since this ensures that the image is out-coupled only in the intended directions. However, to fully utilize the area of the annulus for the propagating modes (see later) it is, however, useful to allow the image to be out-coupled in directions that do not overlap with the original image, that is, to allow other orders than the (0, 0) order to have contributions inside the inner circle. This criterion is also sufficient to guarantee no overlap in the annulus.

Criterion VI can be interpreted as requiring that for every point P in the out-coupling regions, there must for every ray that is in-coupled into the waveguide be some ray path that visits (hits) the out-coupling regions at a point Q sufficiently close to P. For this to occur it is necessary that
  a) the ray paths corresponding to a given in-coupled ray can 'fill' the out-coupling region and that
  b) this fill is dense enough.

Herein, we concentrate on (a), since provided that (a) holds (b) can in principle be satisfied by making the waveguide sufficiently thin, as decreasing the waveguide thickness decreases the constant c. Furthermore, in practice, the configuration of the ray paths can also be used to increase the density of the fill. In order to gain insight into the possible ray paths of any given in-coupled ray, we fix the periods of the gratings so that no diffraction orders higher than the −1, 0, 1 in both directions (except the (0, 0) order) correspond to propagating rays in the waveguide, but this is not a fundamental restriction of the invention presented here and higher orders can straightforwardly be incorporated into the analysis when required.

Figure 8:
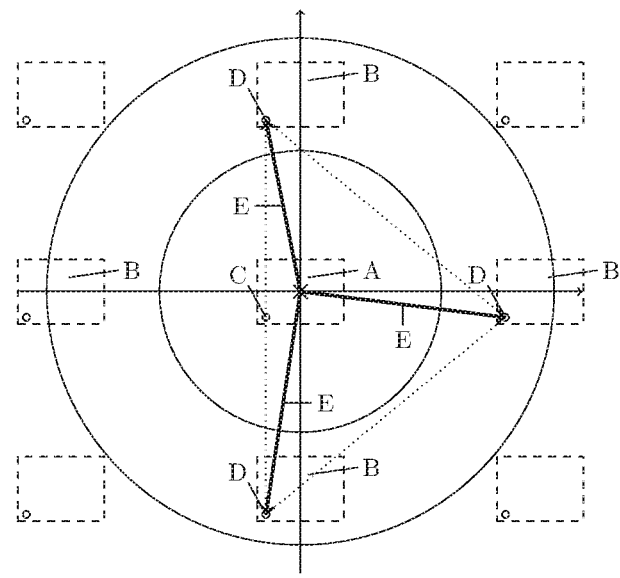

As shown in FIG. 8, the mapping of the image rays (FIG. 8: A) into the corresponding waveguide modes (FIG. 8: B) can be conveniently presented diagrammatically. The diagram also shows how a specific in-coupled ray (FIG. 8: C) is coupled into modes propagating in the waveguide (FIG. 8: D), with the corresponding propagation direction vectors (FIG. 8: E). From these vectors $\rho$ we can compute the corresponding propagation vectors r in the principal planes as shown before. The collection of points where the ray paths, corresponding to the in-coupled ray, hit the principal surfaces (the fill) can then be represented as the linear combination of these vectors r with non-negative integer coefficients. In order to get an idea of how well such a combination fills the out-coupling regions it is, however, more convenient to consider non-negative real coefficients, since then the linear combination is equivalent to the linear combination that can be obtained directly from the vectors in the diagram.

Let us now assume that nothing is known a priori about the positional relationship of the in-coupling and the out-coupling regions, whereby the reachability of out-coupling regions or the filling properties can simply be described as a requirement that every point on a waveguide principal surface is reachable from any other point on the same surface. This assumption sets the present approach clearly apart from traditional approaches, where a specific geometric relationship between the in-coupling and out-coupling regions is assumed and heavily exploited. Specifically, when the relationship between these two regions is known, the waveguide modes that are used to represent an in-coupled ray can be chosen so that they propagate in the correct direction(s). This requires careful placement and choice of grating periods for the singly periodic gratings. Also, it means that only a relatively small portion (typically a part of a quadrant) of the mode annulus can be used to propagate the in-coupled image.

Figure 9:
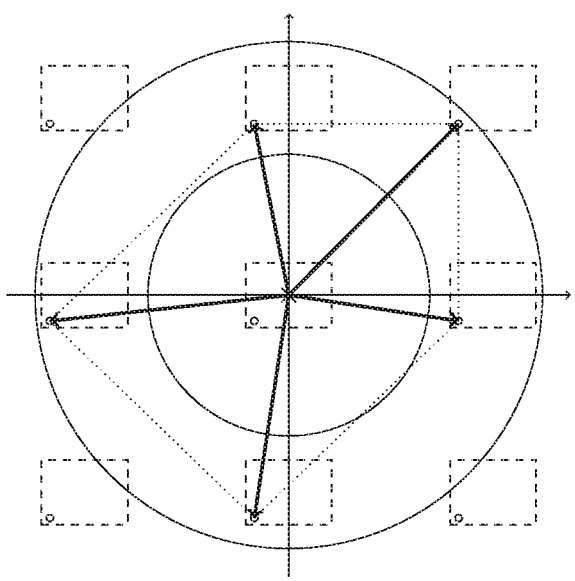
Figure 10:
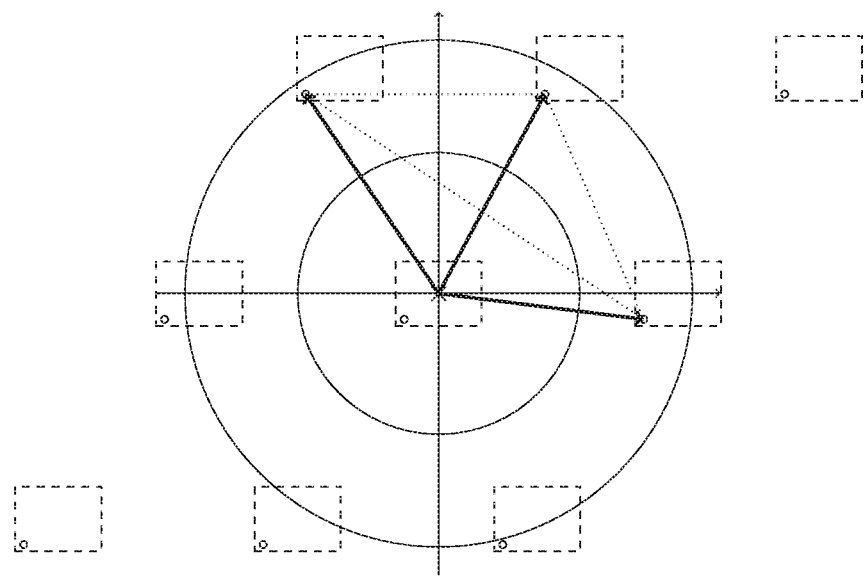
Figure 11:
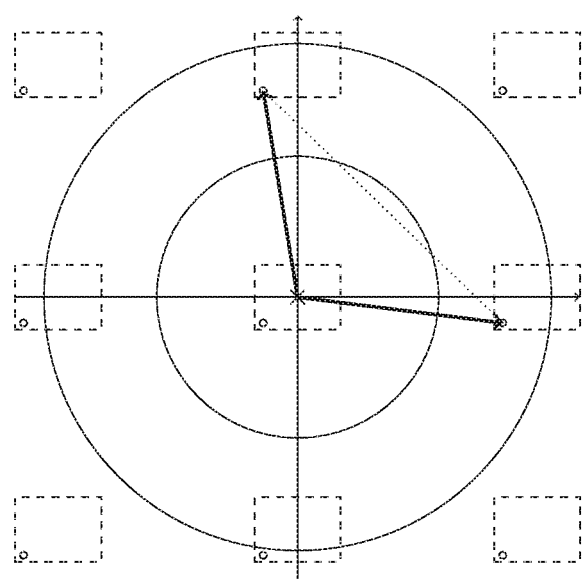

Given a specific in-coupled ray, for all points on the principal surface to be reachable from any other point on the surface any two-dimensional vector must be expressible as the non-negative linear combination of the vectors corresponding to the propagating modes representing the in-coupled ray. In particular, this implies that the zero vector must be expressible as a convex combination of these vectors, which means that the origin in the diagram must be an interior point (inside, but not on the boundary) of the convex hull of the points representing the propagating modes ("origin principle"). Because the origin is an interior point, there is an origin-centered ball with nonzero radius, inside which all points (vectors from the origin) can be expressed as convex combinations of the mode vectors. Since this ball can be scaled to fill all space, it then follows that any two-dimensional vector can be expressed as a non-negative combination of the mode vectors. Hence reachability is equivalent to the "origin principle", which specifies the minimum requirement that the propagating modes of an in-coupled ray must satisfy for the ray paths to fill all space (the out-coupling regions), therefore providing a design rule allowing for advantageous practical implementation of the present element. This design rule has an immediate corollary, which is that there must be at least three different modes corresponding to each in-coupled ray for the ray paths of that ray to be able to fill all space, since less than three points cannot describe a convex hull with an interior (a polygon with a nonzero area) ("mode principle"). The design rule is satisfied by the examples in FIGS. 8 and 9, but violated by the examples in FIGS. 10 and 11 (the convex hull is represented by dotted lines in all these examples).

An immediate consequence of the corollary is that no image that has to be fully propagated can have an area in $\rho_x\rho_y$-space that is larger than ⅓ of the area of the annulus of propagating modes. Since this image area is, for a fixed aspect ratio, related to the FOV, this limitation places a definitive upper bound on the FOV for any system, where the waveguide is planar and the in-coupling and out-coupling is accomplished by gratings. Typically, this bound, however, grossly overestimates the theoretically achievable FOV since most in-coupled rays are usually represented by more than three propagating modes (see for example FIG. 9).

Figure 12:
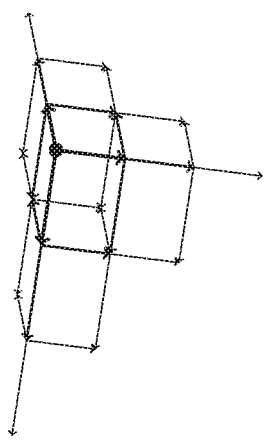
FIGS. 12-15 illustrate ray propagation inside a diffractive element.
Figure 13:
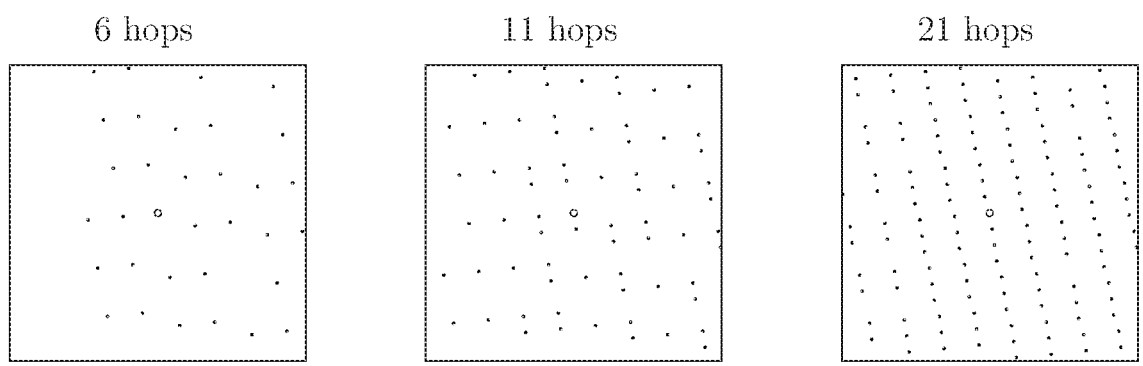

For actual waveguides the locations where the ray path hits the principal surface(s) is given by the non-negative integer combinations of the vectors r, as is illustrated in FIG. 12, where the ray paths of length 3 and less are shown for a particular starting location (filled circle) when the propagation modes of FIG. 8 are applied. The collection of locations visited by ray paths of maximum lengths (hops, number of principal surface hits) 6, 11, and 21 are shown in FIG. 13 for the case of a waveguide with rectangular principal surfaces, where the starting point is marked with a circle.

Figure 14:
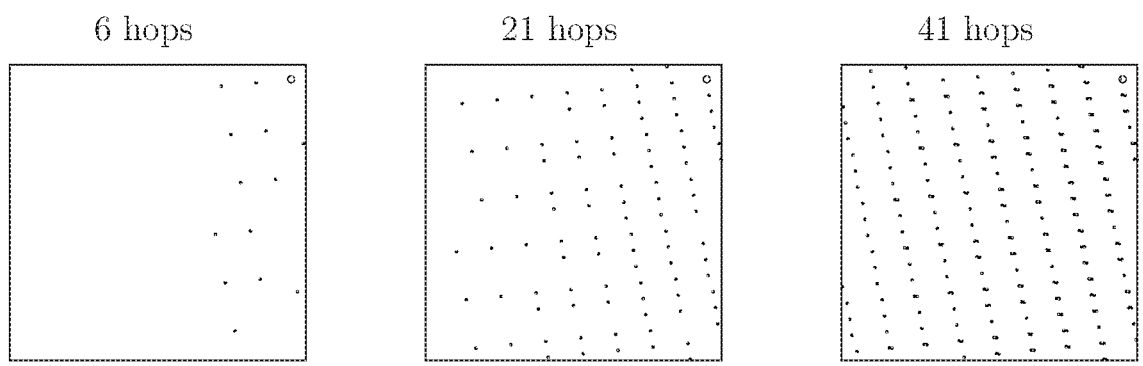
Figure 15:
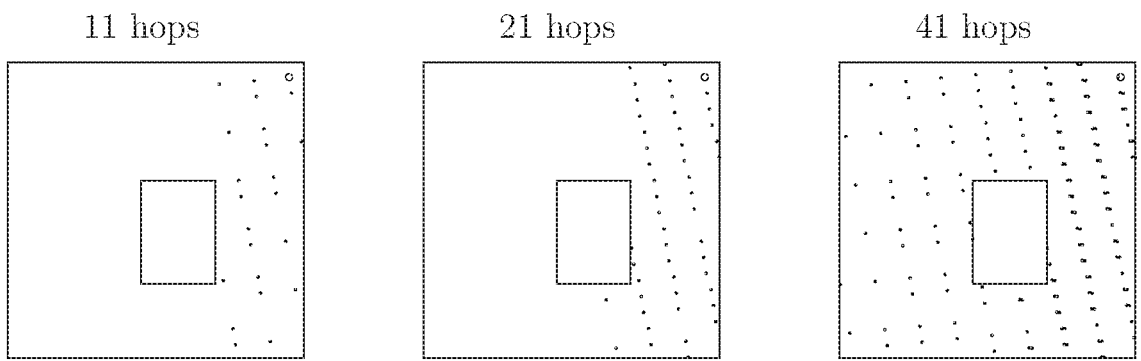
Figure 16:
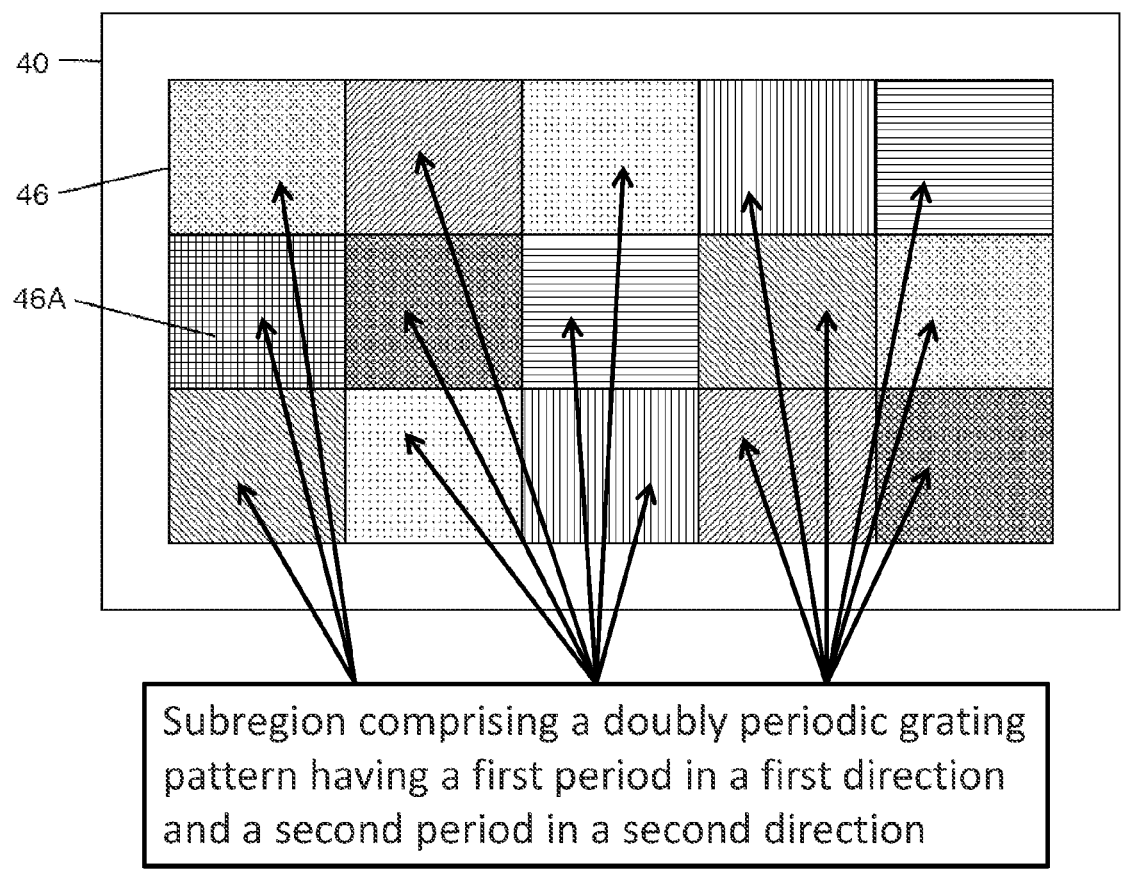
FIG. 16 shows a waveguide with a plurality of subregions, each subregion comprising a doubly periodic grating pattern having a first period in a first direction and a second period in a second direction, as supported by claim 1 as filed.
Figure 17A:
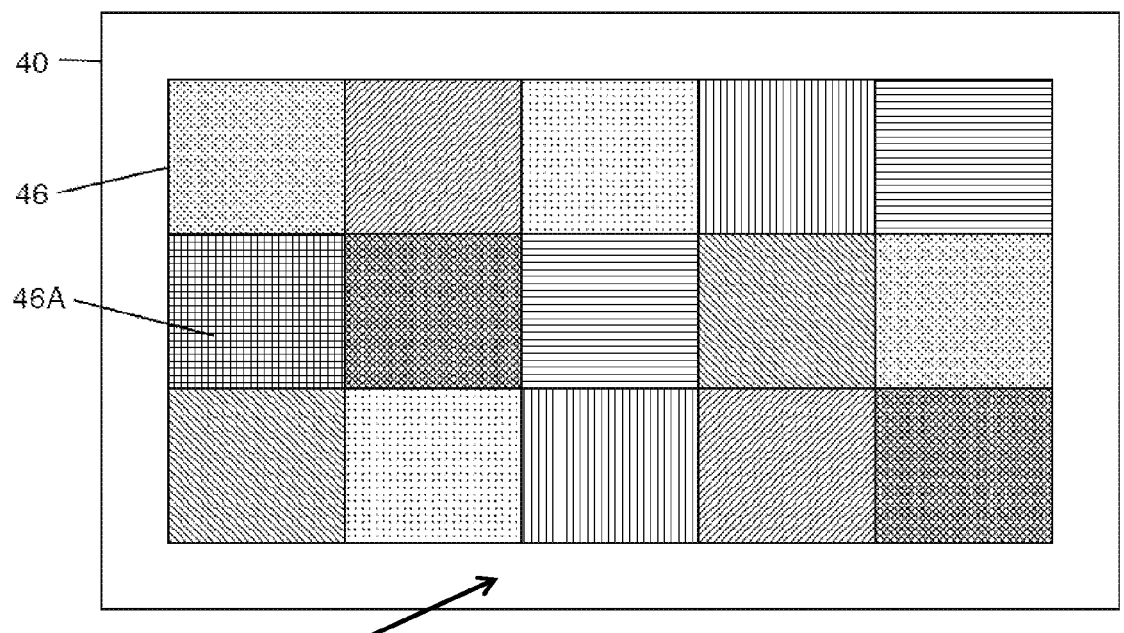
FIG. 17A shows a first surface of a waveguide, and FIG. 17B an opposite of surface of said waveguide, wherein each side comprises a diffractive out-coupling region, as supported by claim 10 as filed.
Figure 17B:
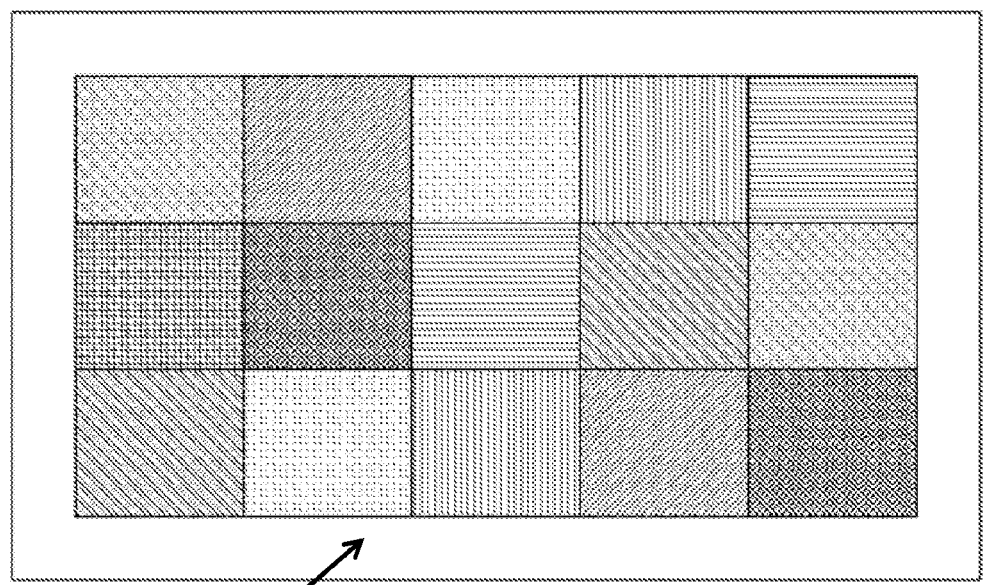

As this example shows, even when the design rule holds, the reachable locations do not form a continuum that fills all space, but comprise only a discrete set of points dispersed throughout space. Thereby the design rule leads to a fulfillment of requirement (a), but (b) is only fulfilled if the dispersion pattern together with the length-scale set by the waveguide thickness and the typical length of the relevant ray paths (those that carry enough intensity to be of consequence to the final results) lead to a sufficient density of locations within the waveguide geometry. Furthermore, this density is also affected by the finiteness and the specific geometry of the waveguide principal surfaces, as the examples in FIGS. 14 and 15 show. In FIG. 14 the starting point lies near a corner of the principal surface and in FIG. 15 the principal surface has a hole in the middle. Consequently, for actual waveguide designs we must augment the design rule presented above by careful analyses of the geometry of the waveguide principal surfaces, the location(s) of the in-coupling region(s), and the waveguide thickness in relation to the directions of propagation provided by the modes available for all pixels in the image, in order to satisfy the criterion VI.

It should be noted that the totality of the ray paths traversed by all subrays of a given incident ray is extremely sensitive to the incident ray direction. This follows in part since the number of locations in the propagating mode annulus has jump discontinuities with respect to the incident ray direction and in part because of the large number of hops taken and the fact that the spatial distribution of diffraction gratings in the out-coupling regions means that small changes in the propagation direction lead to different gratings being traversed. Furthermore, in applications with multiple wavelengths, the wavelength-dependence of the diffraction orders means that the totality of ray paths is also extremely sensitive to the wavelength of the radiation. The great variability of the ray paths implies that even for rays that are close in the sense of wavelength and propagation direction, there are differences in the ray paths and hence there is a great number of design freedoms in the system, which can be utilized when designing the element.

As can be seen from the design rules presented above, the present combined exit pupil expansion and out-coupling scheme essentially only depends on the periodicity of the gratings and the thickness of the waveguide, a waveguide geometry based on these rules can support any number of in-coupling regions. Multiple in-coupling regions are useful when multiple light/image sources are needed, because then no explicit mixing of these sources is required external to the waveguide. An example of such an application is for example when a triad (red, green, blue) of monochromatic lasers are used to produce the full-color image on the in-coupling side of the system. Because no specific geometric relationship (except reachability) between the in-coupling and out-coupling regions is needed, it is possible to utilize it for waveguides with complex geometric shapes.

The above discussion focuses on the implementation of in-coupling grating-type NEDs, in which the full image is propagated inside the waveguide, utilizing the present diffractive element for out-coupling and exit-beam expansion. In general lighting solutions or backlighting solutions, the design is more straightforward, since there is no specific image to be displayed, but the aim is only to spread white light or other wavelength spectrum within the waveguide.

CITATIONS LIST

Patent literature
U.S. Pat. No. 6,580,529
US 2006/0126181
U.S. Pat. No. 8,466,953
U.S. Pat. No. 8,160,411

The invention claimed is:
1. A diffractive element comprising:
a waveguide, and
a diffractive out-coupling region arranged on a surface or inside the waveguide, the out-coupling region comprising a plurality of sub-regions arranged laterally with respect to each other and being adapted to couple light propagating in the waveguide out of the waveguide, wherein said sub-regions are two-dimensionally divided along a direction of the principal surface of the waveguide,
said sub-regions each comprise a doubly periodic grating pattern having a first period in a first direction and a second period in a second direction different from the first direction, and wherein there are at least two sub-regions having different grating patterns, said sub-regions formed of differently shaped periodically arranged elementary features that define said first and said second period, in which at least one of the first direction of the first period or the second direction of the second period is different from each other, and within each sub-region the grating pattern is unchanged.
2. The element according to claim 1, wherein the grating patterns of said at least two sub-regions are adapted to expand the exit-pupil of the element and to out-couple light propagating in the waveguide simultaneously.
3. The element according to claim 2, wherein the grating patterns of said at least two sub-regions are adapted to diffract light internally in the waveguide into at least three different diffraction orders in order to spread light to each location of the out-coupling region, and out of the waveguide using a single diffraction order.
4. The element according to claim 1, wherein within each sub-region, the properties of the grating pattern are constant.
5. The element according to claim 1, wherein the sub-regions are arranged in a regular grid such that they cover a contiguous area of the waveguide.
6. The element according to claim 1, wherein the sub-regions are arranged in an irregular formation such that they cover a contiguous area of the waveguide.
7. The element according to claim 1, further comprising a further sub-divided diffractive out-coupling region on an opposite surface of the waveguide from the diffractive out-coupling region.
8. The element according to claim 1, wherein the doubly periodic grating pattern of each of said sub-regions is different from the doubly periodic grating pattern of any other sub-region.
9. The element according to claim 1, wherein said grating patterns of the sub-regions are chosen so as to diffract light each in the same diffraction orders but with different diffraction efficiencies.
10. The element according to claim 1, further comprising one or more diffractive in-coupling regions arranged to the waveguide, the in-coupling region(s) being adapted to diffractively couple light directed thereto to the waveguide for propagation to the out-coupling region via total internal reflections.
11. The element according to claim 10, wherein the out-coupling region is configured, by said doubly periodic grating patterns of said sub-regions, to expand the exit pupil of the element and to retain relative pixel positions in the image between the out-coupling region and the in-coupling region.
12. The element according to claim 10, wherein each image pixel of the in-coupling region and corresponding image pixel of the out-coupling region is represented by at least three ray directions propagating in the waveguide, whose convex combinations comprise all possible propagation directions.
13. The element according to claim 10, wherein the out-coupling region is configured, by said doubly periodic grating patterns of said sub-regions, so that possible ray paths of different image pixels from the in-coupling region to the out-coupling region significantly differ from each other.
14. The element according to claim 10, wherein the doubly periodic grating patterns are capable of, at each sub-region, utilizing multiple different diffraction orders of the in-coupled light for expanding the exit pupil of the element, and one diffraction order for out-coupling light from the element such that rays of in-coupled light retain their directions as such or mirrored after being out-coupled by said sub-regions.
15. The element according to claim 1, wherein the shapes and locations of the sub-regions and the grating patterns of the sub-regions are chosen so as to expand the FOV of the out-coupling region for monochromatic light in at least one direction by at least 50% compared with a FOV achievable using singly periodic gratings and the same waveguide material.

16. The element according to claim 1, wherein the number of sub-regions is 10 or more and the size of each sub-region is at least ten grating periods in both said first direction and said second direction.

17. The element according to claim 1, further comprising at least one second waveguide which is optically functionally connected with the waveguide comprising said out-coupling region.

18. The element of claim 1, wherein neighboring sub-regions of the plurality of laterally arranged sub-regions have different distinguishable grating patterns with respect to each other.

19. The element of claim 1, wherein the sub-regions cover a contiguous area of the waveguide being directly adjacent to each other.

20. An optical product, comprising a diffractive element and a light source adapted to direct light to the diffractive element, wherein the diffractive element comprises:
a waveguide, and
a diffractive out-coupling region arranged on a surface or inside the waveguide, the out-coupling region comprising a plurality of sub-regions arranged laterally with respect to each other and being adapted to couple light propagating in the waveguide out of the waveguide, wherein said sub-regions are two-dimensionally divided along a direction of the principal surface of the waveguide,
said sub-regions each comprise a doubly periodic grating pattern having a first period in a first direction and a second period in a second direction different from the first direction, and wherein there are at least two sub-regions having different grating patterns, said sub-regions formed of differently shaped periodically arranged elementary features that define said first and said second period, in which at least one of the first direction of the first period or the second direction of the second period is different from each other, and within each sub-region the grating pattern is unchanged.

21. The optical product according to claim 20, wherein the product is a personal display device, wherein said light source is an image projector.

22. The optical product according to claim 21, wherein:
the diffractive element comprises a diffractive in-coupling grating adapted to couple light to the out-coupling region via total internal reflections taking place in the waveguide, and
the image projector is adapted to project an image to the in-coupling grating.

23. The optical product according to claim 21, wherein the out-coupling region is adapted so as to present the image of the image projector directly to an eye of the user of the device.

24. The optical product according to claim 21, wherein the device comprises a stack of two or more waveguides arranged as a cascade, at least one other of the waveguides comprising an in-coupling region, whereby the out-coupling region is configured to feed said in-coupling region of said other waveguide.

25. The optical product according to claim 20, wherein the product is a lighting device.

26. The optical product according to claim 20, wherein the product is a backlight element of a display element.

27. A method of producing a viewable image, comprising:
directing light to a waveguide, and
coupling said light out of the waveguide using a diffractive out-coupling region arranged to the waveguide and being capable of simultaneously expanding the exit pupil and coupling light out of the out-coupling region, wherein the out-coupling region comprises a plurality of different sub-regions arranged laterally with respect to each other, wherein said sub- regions are two-dimensionally divided along a direction of the principal surface of the waveguide, wherein the sub-regions each comprise a doubly periodic grating pattern having a first period in a first direction and a second period in a second direction different from the first direction, and wherein there are at least two sub-regions having different grating patterns, said sub-regions formed of differently shaped periodically arranged elementary features that define said first and said second period, in which at least one of the first direction of the first period or the second direction of the second period is different from each other, and within each sub-region the grating pattern is unchanged so as to simultaneously expand the exit pupil and couple light out of the out-coupling region by said at least two sub-regions at each location thereo.

28. The method according to claim 27, wherein the light is directed to the waveguide:
through an in-coupling grating arranged on the waveguide, or
from a lateral side of the waveguide.

* * * * *